United States Patent
Skarp

(10) Patent No.: US 8,830,910 B2
(45) Date of Patent: Sep. 9, 2014

(54) WIRELESS TERMINALS INCLUDING SMART ANTENNA SYSTEMS HAVING MULTIPLE ANTENNAS

(75) Inventor: Filip Skarp, Sodra Sandby (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 128 days.

(21) Appl. No.: 13/496,944

(22) PCT Filed: Dec. 15, 2010

(86) PCT No.: PCT/IB2010/003254
§ 371 (c)(1),
(2), (4) Date: Mar. 19, 2012

(87) PCT Pub. No.: WO2012/080764
PCT Pub. Date: Jun. 21, 2012

(65) Prior Publication Data
US 2012/0320803 A1  Dec. 20, 2012

(51) Int. Cl.
*H04W 4/00* (2009.01)
*H04B 7/04* (2006.01)
*H04B 7/08* (2006.01)

(52) U.S. Cl.
CPC ............ *H04B 7/0877* (2013.01); *H04B 7/0825* (2013.01); *H04B 7/0404* (2013.01)
USPC ........................................................ 370/328

(58) Field of Classification Search
None
See application file for complete search history.

(56) References Cited

U.S. PATENT DOCUMENTS

| 6,173,014 | B1* | 1/2001 | Forssen et al. ............... 375/267 |
| 7,260,079 | B1* | 8/2007 | Chapman et al. ............. 370/338 |
| 2001/0014588 | A1 | 8/2001 | Ishida |
| 2002/0193146 | A1* | 12/2002 | Wallace et al. ............... 455/562 |
| 2005/0136906 | A1* | 6/2005 | Azuma ......................... 455/418 |
| 2007/0167142 | A1 | 7/2007 | Kim et al. |

(Continued)

FOREIGN PATENT DOCUMENTS

WO  WO 2009/120118 A1  10/2009
WO  WO 2010/110800 A1  9/2010

OTHER PUBLICATIONS

International Search Report Corresponding to International Application No. PCT/IB2010/003254; Date of Mailing: Sep. 20, 2011; 13 pages.

(Continued)

*Primary Examiner* — Anh-Vu Ly
*Assistant Examiner* — Gustavo Lopez-Vargas
(74) *Attorney, Agent, or Firm* — Myers Bigel Sibley & Sajovec, PA

(57) ABSTRACT

A wireless communication device includes a transceiver configured for communication using multiple communication modes, the transceiver comprising a transmitter and a receiver. A plurality of antennas is coupled to the transceiver. The plurality of antennas includes a first antenna and a second antenna. The multiple communication modes include a multiple input multiple output ("MIMO") mode and a single antenna receive mode. The device further includes a control circuit configured to detect selection of the single antenna receive mode as an active one of the multiple communication modes and to automatically alter a configuration of the plurality of antennas and transceiver by configuring the first antenna as a transmit only antenna and the second antenna as a receive only antenna responsive to detection of the selection of the single antenna receive mode. Related methods of operation are also discussed.

24 Claims, 4 Drawing Sheets

(56) References Cited

U.S. PATENT DOCUMENTS

| | | |
|---|---|---|
| 2008/0261539 A1* | 10/2008 | Chen et al. .................... 455/73 |
| 2008/0261551 A1* | 10/2008 | Catreux-Erceg et al. ..... 455/272 |
| 2010/0216412 A1* | 8/2010 | Rofougaran ................. 455/78 |
| 2011/0040836 A1* | 2/2011 | Allen et al. .................. 709/205 |
| 2011/0096687 A1* | 4/2011 | Dottling et al. .............. 370/252 |
| 2011/0116423 A1* | 5/2011 | Rousu et al. ................ 370/297 |
| 2012/0058738 A1* | 3/2012 | Lagnado et al. ............. 455/90.3 |
| 2012/0129562 A1* | 5/2012 | Stamoulis et al. ........... 455/517 |

OTHER PUBLICATIONS

Motorola, "Introduction of Rel-10 LTE-Advanced features in 36.213", 3GPP TSG RAN Meeting #63, R1-106450, Jacksonville, USA, Nov. 15-19, 2010, 90 pages.

Notification Concerning Transmittal of International Preliminary Report on Patentability in corresponding PCT Application No. PCT/IB2010/003254; mailed Jun. 27, 2013 (8 pages).

* cited by examiner

WIRELESS TERMINALS INCLUDING SMART ANTENNA SYSTEMS HAVING MULTIPLE ANTENNAS

RELATED APPLICATION

The present application is a 35 U.S.C. §371 national stage application of PCT International Application No. PCT/IB2010/003254, having an international filing date of Dec. 15, 2010, the disclosure of which is incorporated by reference herein in its entirety.

FIELD OF THE INVENTION

The present invention relates to antennas for wireless communications, and in particular relates to wireless communication terminals including at least primary and secondary antennas and control thereof.

BACKGROUND

Wireless communication channels suffer from fading, or loss of signal, due to changes in the propagation environment of the wireless signal. Some types of fading, such as Rayleigh fading, can be highly localized in nature. Furthermore, wireless communication systems are often limited in the amount of bandwidth that can be used, due to practical restrictions on the electronics that are used, or due to licensing and regulatory restrictions.

The performance of wireless communications may depend on antenna systems, also known as smart or intelligent antennas. Recently, multiple antenna technologies have emerged to achieve the goals of 4G systems, such as high rate, high reliability, and long range communications. For example, multiple-input and multiple-output, or MIMO, refers to the use of multiple antennas at the transmitter and the receiver end of a wireless link. MIMO technology may offer significant increases in data throughput and/or transmission range without the need for additional bandwidth or transmit power. It can achieve this due to the ability of MIMO to obtain higher spectral efficiency (more bits per second per hertz of bandwidth), link reliability, and/or reduced fading.

MIMO based systems may allow the use of a variety of coding techniques that take advantage of the presence of multiple transmit and receive antennas. For example, wireless communications performed over a MIMO channel can use beamforming, spatial multiplexing and/or diversity coding techniques.

Beamforming involves transmitting the same signal on each of the transmit antennas with appropriate complex (i.e., gain and phase) weighting such that the signal power is increased at the receiver input. The benefits of beamforming may include increased signal gain from constructive interference and reduced multipath fading.

In spatial multiplexing, a high data rate signal is split into multiple lower data rate streams, and each stream is transmitted from a different transmit antenna in the same frequency channel. The receiver separates the received streams and combines the received data streams into a single receive stream, thereby increasing channel capacity.

In diversity coding methods, a single stream is transmitted, but the signal is coded using space-time coding techniques so that the signal emitted from each of the transmit antennas is substantially orthogonal. Diversity coding exploits the independent fading in the multiple antenna links to enhance signal diversity.

To increase performance of a MIMO system, it is desirable for fading on the wireless links between the transmit and receive antennas to be uncorrelated. That is, it is desirable for there to be a low statistical correlation between fading experienced at one antenna and fading experienced at another antenna.

Correlation between antennas can be reduced by causing the antennas to have different polarizations, i.e. sending and receiving signals with orthogonal polarizations. Furthermore, antennas for MIMO systems may utilize spatial separation, or physical separation, to reduce correlation between antennas.

Generally, for frequency division duplex ("FDD") systems with simultaneous transmit and receive, such as code division multiple access (CDMA), Universal Mobile Telecommunications System (UMTS), 3GPP LTE (3rd Generation Partnership Project Long Term Evolution) and the like, there is a problem with the transmitter reducing the sensitivity of the receiver. The problem is, generally, most significant when the transmitter is working at maximum transmit power. In other words, the problem is most noticeable under poor signal conditions. The phenomenon is usually referred to as "Tx on desense."

With the introduction of MIMO and diversity, a secondary antenna is added to the system. This antenna is a generally configured as a pure receive antenna (i.e., only used as a receive antenna) and is used to increase the download throughput. However, the modulation of choice and utilization of the secondary antenna will vary depending on the signal conditions. In good signal conditions, the secondary antenna will generally be used for MIMO and, as the signal drops, the usage will be reduced to diversity and, at the cell edge, the higher order data modulation might not be used at all. The gain of the diversity antenna at the cell edge is generally not used, at least for voice communications and, as such, the secondary antenna is not used.

Generally, the determination to use the MIMO communication mode is made by the wireless system based on power readings received from the mobile terminal, such as received signal strength ("RSSI") and/or received signal carrier power ("RSCP") measures of received signal power level. When MIMO is not selected for the mobile terminal, the mobile terminal itself generally determines how to use the multiple antennas in the mobile terminal.

SUMMARY

Some embodiments of the present invention provide wireless communication devices including a transceiver configured for communication using multiple communication modes, the transceiver comprising a transmitter and a receiver. A plurality of antennas is coupled to the transceiver. The plurality of antennas includes a first antenna and a second antenna. The multiple communication modes include a multiple input multiple output ("MIMO") mode and a single antenna receive mode. The device further includes a control circuit configured to detect selection of the single antenna receive mode as an active one of the multiple communication modes and to automatically alter a configuration of the plurality of antennas and transceiver by configuring the first antenna as a transmit only antenna and the second antenna as a receive only antenna responsive to detection of the selection of the single antenna receive mode.

In other embodiments, the control circuit includes a duplexer having a first terminal that couples the first antenna to the transmitter and a second terminal that couples the first antenna to the receiver. The duplexer is not coupled to the second antenna. The control circuit further includes a filter that couples the second antenna to the receiver. The receiver may include a first amplifier coupled to the first antenna through the second terminal of the duplexer and a second amplifier coupled to the second antenna through the filter. The first and second amplifier may be low noise amplifiers. The control circuit may be configured to alter the configuration of the plurality of antennas by turning off the first amplifier. The control circuit may be configured to alter the configuration of the plurality of antennas by grounding the second terminal of the duplexer. The control circuit may be configured to alter the configuration of the plurality of antennas by coupling the second terminal of the duplexer to a 50 ohm terminator.

In further embodiments, the device further includes a processor coupled to the control circuit and the transceiver that is configured increase a transmit power of the transmitter and to select the single antenna receive mode as the active one of the multiple communication modes when the transmit power of the transmitter exceeds a selection level to increase isolation between the first and second antennas when the transmit power of the transmitter exceeds the selection level. The processor may also be configured to reduce the transmit power of the transmitter when the control circuit configures the first antenna as a transmit only antenna and the second antenna as a receive only antenna.

In other embodiments, the processor is configured to receive a command to enter the MIMO mode from the receiver and to select the MIMO mode as the active one of the multiple communication modes responsive to the received command to enter the MIMO mode. The transceiver may communicatively couple the device to a base station scheduler. The command to enter the MIMO mode may be received by the receiver from the base station scheduler. The processor may be configured to detect a received signal power level and to report the received signal power level to the base station scheduler and the command to enter the MIMO mode may only be received from the base station scheduler when the reported received signal power level exceeds a minimum level and wherein the processor is further configured to exit the MIMO mode responsive to receipt of a command to exit the MIMO mode from the base station scheduler. The command to exit the MIMO mode may only be received from the base station scheduler when the reported received signal power level does not exceed the minimum level.

In further embodiments, the processor is also configured to increase the transmit power of the transmitter and to decrease the transmit power. The selection level for selecting the single antenna receive mode corresponds to a received signal power level that does not exceed the minimum level so that the processor does not select the single antenna receive mode when the base station scheduler selects the MIMO mode.

In yet further embodiments, the first antenna and the second antenna are correlated antennas having less than a 5 decibel (dB) imbalance. When in the single antenna receive mode, the device may be configured to receive voice communications but not data communications. In the MIMO mode, both the first and second antennas may be used as receive antennas. The first antenna may not be used in any of the multiple communication modes as a receive antenna when the second antenna is not also used as a receive antenna. The second antenna may not be coupled to the transmitter.

In yet other embodiments, methods of operating an antenna system of a wireless communication device including a first antenna and a second antenna include configuring the first antenna and the second antenna to receive a signal responsive to detection of selection of a multiple input multiple output ("MIMO") mode of the antenna system. At least the first antenna is configured to transmit a signal responsive to detection of selection of the MIMO mode. The first antenna is automatically configured to transmit responsive to detection of selection of a single antenna receive mode of the antenna system and only the second antenna is configured to receive a signal responsive to detection of selection of the single antenna receive mode.

In further embodiments, the first antenna is coupled to a receiver through an amplifier and automatically configuring only the second antenna to receive a signal comprises turning off the amplifier. The first antenna may be coupled to a transmitter through a first terminal of a duplexer and to a receiver through a second terminal of the duplexer and automatically configuring only the second antenna to receive a signal comprises grounding the second terminal of the duplexer or coupling the second terminal of the duplexer to a 50 ohm terminator.

In other embodiments, the first antenna is coupled to a transmitter through a first terminal of a duplexer and to a receiver through a second terminal of the duplexer and the method further includes selecting the single antenna receive mode when a transmit power of the transmitter exceeds a selection level to increase isolation between the first and second antennas when the transmit power of the transmitter exceeds the selection level. The method may further include decreasing the transmit power of the transmitter when only the second antenna is configured to receive a signal. Configuring the first antenna and the second antenna may be preceded by determining that only voice communications are requested and selecting the single antenna receive mode when it is determined that only voice communications are requested.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS

Figure 1:
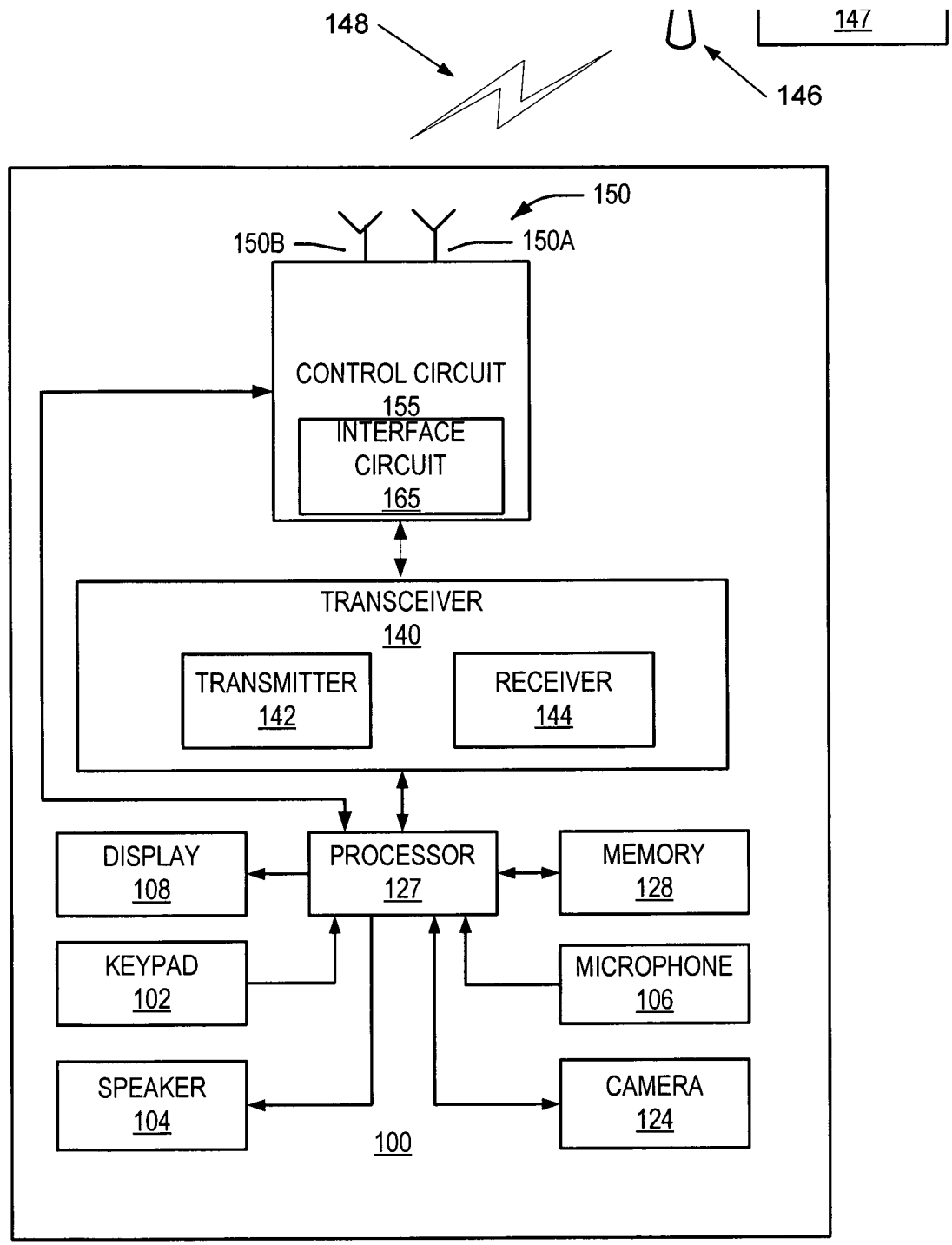
FIG. 1 is a block diagram of a wireless communication device according to some embodiments of the present invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As used herein, a "wireless communication device" includes, but is not limited to, a device that is configured to receive/transmit communication signals via a wireless interface with, for example, a cellular network, a wireless local area network (WLAN), a digital television network such as a DVB-H network, a satellite network, an AM/FM broadcast transmitter, and/or another communication terminal. A wireless communication device may be referred to as a "wireless communication terminal," a "wireless terminal" and/or a "mobile terminal." Examples of wireless communication devices include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radio transceiver, including WLAN routers and the like.

For purposes of illustration and explanation only, various embodiments of the present invention are described herein in the context of a wireless communication device that includes a MIMO antenna that is configured to transmit and/or receive RF signals in two or more modes using two or more antennas. The MIMO antenna may be configured, for example, to operate in any of the modes discussed for MIMO operation in the background section above.

As used herein, the "efficiency" of an antenna (also referred to as an antenna element) or array may refer to the ratio of the total radiated power to the total input power, where the total radiated power is based on the total input power less losses (for example, due to coupling, correlation, and/or dissipation). In contrast, the link spectral efficiency of a digital communication system refers to the net bitrate or maximum throughput divided by the bandwidth in hertz of a communication channel or a data link, as measured in bit/s/Hz, or (bit/s)/Hz.

Wireless communication between electronic devices may be accomplished using a wide variety of communication media, communication systems and communication standards. For example, mobile terminals such as wireless mobile telephones are typically configured to communicate via analog and/or digital wireless radio frequency (RF) telephone systems. Such devices may additionally be configured to communicate using wired and/or wireless local area networks (LANs), short range communication channels, such as Bluetooth RF communication channels and/or infrared communication channels, and/or long range communication systems, such as satellite communication systems. Mobile terminals may increasingly include more than one antenna element, for example, due to requirements for multiple-input-multiple-output (MIMO) communications, diversity, multi-band compatibility, and/or multi-system compatibility.

Some embodiments of the present invention arise from a realization that performance and power consumption may suffer in mobile terminals and/or other portable wireless communication devices including more than one antenna element due, for example, to Tx on desense, coupling, correlation, and/or material losses. For example, in a LTE (Long Term Evolution) or HSPA (High Speed Packet Access) multi-antenna terminal or dongle, having multiple antennas may improve performance in some communication modes, but may result in mutual coupling losses in other communication modes.

More particularly, some embodiments of the present invention arise from a realization that the secondary antenna of MIMO antenna systems may be of no real use to the system in really poor signal conditions. As these are generally the conditions where the transmitter affects the receiver the most (transmitting at maximum power) a significant problem may be solved if the secondary antenna is used as primary receive antenna under poor signal conditions. Such may provide added isolation between transmit and receive under the worst conditions leading to the possibility of relaxing the isolation specification of the duplexer (i.e., may reduce or even eliminate Tx on desense). This, in turn, may lead to lower transmit insertion loss affecting the receive antenna, reduced current consumption (less current leakage in the duplexer) and/or better TRP. In addition, a lower cost duplexer may be used.

To address these and other issues, embodiments of the present invention provide a switchable or reconfigurable "smart" antenna array including multiple antenna elements, where one or more of the antenna elements may be selectively switched to transmit only or receive only operations based on the communication mode that is being utilized. Switching of antenna elements may be implemented by software, hardware or a combination of software and hardware in some embodiments. Accordingly, reconfigurable smart antenna systems in accordance with embodiments of the present invention may enhance the performance of a mobile terminal and/or other portable wireless communication device when used in different communication modes.

A wireless communication device 100 according to some embodiments is illustrated in FIG. 1. The wireless communication device 100 may be configured to transmit and/or receive wireless signals over multiple wireless communication interfaces. For example, a wireless communication device 100 according to some embodiments can include a cellular communication module, a Bluetooth module, an infrared communication module, a global positioning system (GPS) module, a WLAN module, and/or other types of communication modules.

With a cellular communication module, the wireless communication device 100 can communicate using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, Universal Mobile Telecommunications System (UMTS), and 3GPP LTE (3rd Generation Partnership Project Long Term Evolution).

With a Bluetooth or infrared module, the wireless communication device 100 can communicate via an ad-hoc network using a direct wireless interface. With a WLAN module, the wireless communication device 100 can communicate through a WLAN router using a communication protocol that may include, but is not limited to, 802.11a, 802.11b, 802.11e, 802.11g, 802.11i and/or 802.11n.

In particular, the wireless communication device 100 includes a display 108, such as a liquid crystal display (LCD) and/or an organic light emitting diode (OLED) display. The wireless communication device 100 may optionally include a keypad 102 or other user input mechanism on the housing of the device 100. In some embodiments, the display 108 may be provided with touchscreen capability to replace and/or supplement the keypad 102.

The wireless communication device 100 may include a microphone 106 and an earphone/speaker 104. The housing may be designed to form an acoustic seal to the user's ear when the earphone/speaker 104 is placed against the user's head.

The keypad 102, display 108, microphone 106, speaker 104 and a camera 124 may be coupled to a processor 127, such as a microprocessor or microcontroller, which may be configured to control operations of the wireless communication device 100. The wireless communication device 100 may further include a transceiver 140 and a memory 128 coupled to the processor 127. Other electronic circuitry, such as a WLAN communication interface, a Bluetooth interface, a GPS interface, a digital signal processor, etc., may also be included in the electronic circuitry of the device 100.

The memory 128 may be a general purpose memory that is used to store both program instructions for the processor 127 as well as data, such as audio data, video data, configuration data, and/or other data that may be accessed and/or used by the processor 127. The memory 128 may include a nonvolatile read/write memory, a read-only memory and/or a volatile read/write memory. In particular, the memory 128 may include a read-only memory in which basic operating system instructions are stored, a non-volatile read/write memory in which re-usable data, such as configuration information, directory information, and other information may be stored, as well as a volatile read/write memory, in which short-term instructions and/or temporary data may be stored.

The transceiver 140 typically includes a transmitter circuit 142 and a receiver circuit 144 which cooperate to transmit and receive radio frequency signals over a wireless communication channel 148 to remote transceivers, such as the cellular base station 146, via a plurality of antennas 150. The radio frequency signals transmitted between the device 100 and the remote transceivers may comprise both traffic and control signals (e.g., paging signals/messages for incoming calls), which are used to establish and maintain communication with another party or destination. More particularly, the transceiver 140, in operational cooperation with the processor 127, may be configured for communication according to multiple radio access technologies and/or multiple communication modes. The radio access technologies may include, but are not limited to, WLAN (e.g., 802.11), WiMAX (Worldwide Interoperability for Microwave Access), 3GPP LTE (3rd Generation Partnership Project Long Term Evolution), Universal Mobile Telecommunications System (UMTS), Global Standard for Mobile (GSM) communication, General Packet Radio Service (GPRS), enhanced data rates for GSM evolution (EDGE), DCS, PDC, PCS, code division multiple access (CDMA), wideband-CDMA, and/or CDMA2000. Other radio access technologies and/or frequency bands can also be used in embodiments according to the invention. More particularly, in some embodiments the multiple communication modes/radio access technologies include a multiple input multiple output ("MIMO") mode and a single antenna receive mode. As used herein, "MIMO mode" includes any mode using at least two receive antennas at the wireless communication device.

The plurality of antennas 150 is coupled to the transceiver 140 through the interface circuit 165. The plurality of antennas includes a plurality of antenna elements, illustrated as a first or primary antenna 150A and a second or secondary antenna 150B. However, the plurality of antennas 150 can include more than two antenna elements 150A, 150B in some embodiments. The interface circuit 165 is operable, for example, to provide separate communication paths for supplying/receiving RF signals to different radiating elements of the antenna 150 via respective RF feeds. Accordingly, when the plurality of antennas 150 includes two antenna elements 150A, 150B, such as shown in FIG. 1, the interface circuit 165 may provide separate communication circuits to each of the antenna elements 150A, 150B.

Based on a wireless signal received at the plurality of antennas 150, the processor 127 is operable to detect and select an available one of the multiple radio access technologies supported by the transceiver 140 and automatically alter a configuration of the plurality of antennas 150 in response thereto to provide respective antenna configurations that are compatible with different radio access technologies/modes. In particular, the processor 127 may operate the transceiver 140 and the plurality of antennas 150 to scan for available radio frequency signals and perform handshaking operations with one or more respective base stations 146. Each base station 146 may thereby transmit a respective wireless signal indicating the availability of a corresponding radio access technology, which may be determined/specified by a base station scheduler 147 operatively coupled to the base station 146. The respective wireless signals may be received at the plurality of antennas 150, and the processor 127 may detect and select (at the direction of the base station schedule 147 or on its own) one of the available radio access technologies. In some embodiments, the MIMO mode is selected and deselected at the direction of the base station scheduler 147 while one or more other modes may be selected by the processor 127 when the base station scheduler 147 has deactivated the MIMO mode for the device 100.

The control circuit 155 may adaptively adjust the configuration of the plurality of antennas 150 using an interface circuit 165 of the control circuit 155. In some embodiments, the interface circuit 165 may be implemented in hardware and the logic control of the interface circuit 165 may be implemented in software in the control circuit 155. The software component of the control circuit 155 may be a module stored in the memory 128 and executed on the processor 127. Accordingly, while the control circuit 155 and processor 127 are shown as separate boxes in FIG. 1, some or all of the control circuit 155 may be implemented on the processor 127. Thus, as described in greater detail below, the processor 127 and the control circuit 155 are configured to detect selection of communication modes and to selectively switch the configuration of first antenna element 150A and/or the second antenna element 150B. More particularly, as will be further described with reference to FIGS. 2 and 3, the control circuit 155 in some embodiments is configured to automatically alter a configuration (coupling) of the plurality of antennas 150 and transceiver 140 by configuring the first antenna as a transmit only antenna and the second antenna as a receive only antenna responsive to detection of the selection of the single antenna receive mode.

Figure 2:
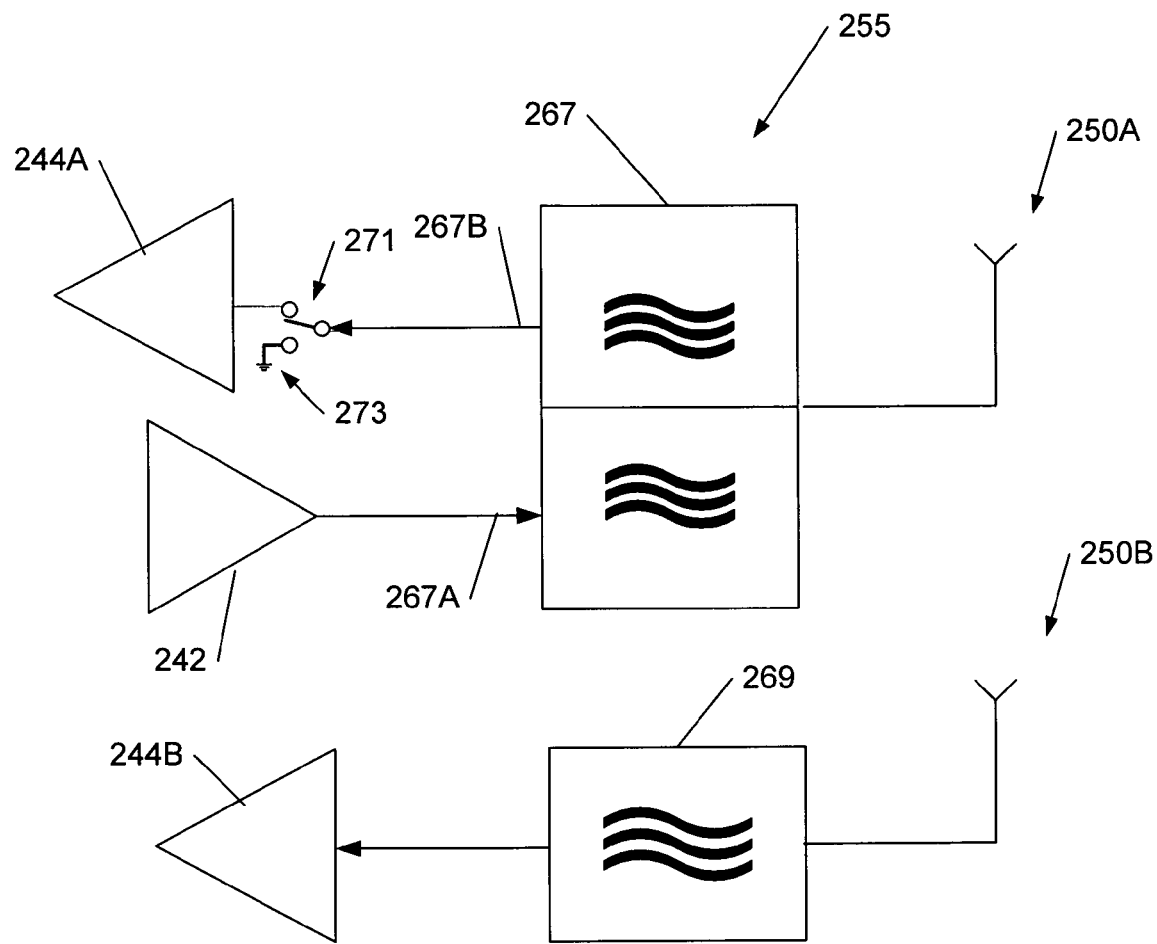
FIG. 2 is a block diagram schematically illustrating a control circuit of wireless communication device in a MIMO mode configuration according to some embodiments of the present invention.

FIG. 2 schematically illustrates the coupling between the plurality of antennas and the transceiver according to some embodiments in the MIMO mode. In particular, as shown in FIG. 2, a plurality of antennas 250 includes two antenna elements 250A and 250B that may be provided in the wireless communication device 100. In some embodiments, the first antenna and the second antenna are correlated antennas having less than a 5 decibel (dB) imbalance. In other embodiments, the antennas have less than a 3 dB imbalance. Such embodiments may provide improved performance in the MIMO mode by using correlated antennas.

Also shown in FIG. 2 is a transceiver circuit including a transmitter 242 and a receiver circuit including a first amplifier (receiver) 244A and a second amplifier (receiver) 244B, which may be low noise amplifiers. In some embodiments, the receivers 244A, 244B may be low noise amplifiers. The transceiver circuit is coupled to the plurality of antennas 250 by a control circuit 255.

Figure 3:
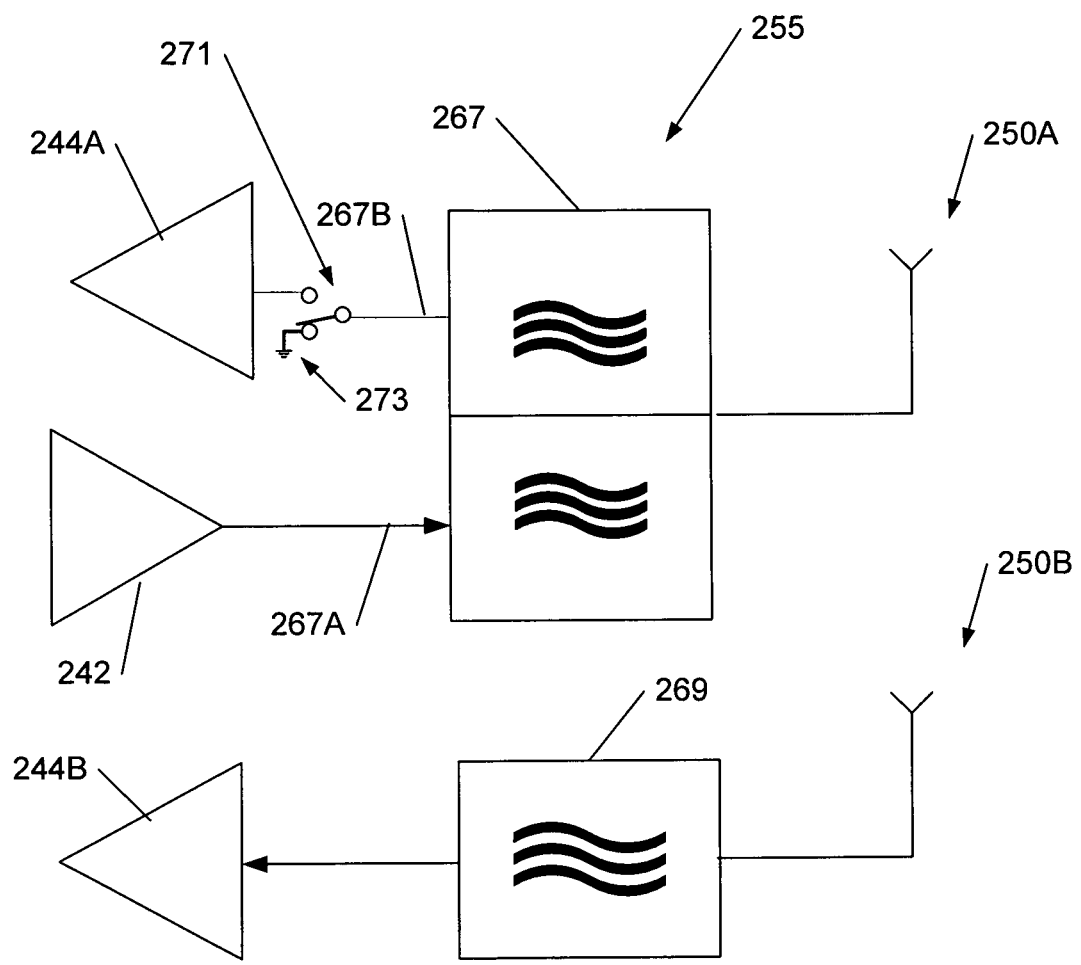
FIG. 3 is a block diagram schematically illustrating the control circuit of FIG. 2 in a single receive antenna mode configuration according to some embodiments of the present invention.

For the embodiments illustrated in FIGS. 2 and 3, the control circuit 255 includes a duplexer 267 having a first terminal 267A that couples the first antenna element 250A to the transmitter 242 and a second terminal 267B that couples the first antenna element 250A to the first receiver 244A. The second terminal 267B is selectively coupled to the first receiver by a switch 271 having a first terminal coupled to the receiver 244A and a second terminal 267B connected to a termination 273. FIG. 2 illustrates embodiments of the device 100 in a MIMO mode with the switch 271 coupling the second terminal 267B connected to the receiver 244A. FIG. 3 illustrates embodiments of the device 100 in a single antenna receive mode with the switch 271 coupling the second terminal 267B connected to the termination 273. As will be further explained below, the switch 271 symbolically illustrates the coupling and decoupling of the receiver 244A but in some embodiments the coupling and decoupling may be provided without the illustrated switch 271. For example, rather than switching the connection in the single antenna receive mode, the receiver 244A may be deactivated, for example, by not supplying a power source to the receiver 244A.

For the embodiments illustrated in FIGS. 2 and 3, the second antenna element 250B is shown as not being coupled to a transmitter. In other words, the second antenna element 250B is a receive only secondary antenna that is coupled to the receiver by a filter 269, rather than through a duplexer. However, it will be understood that the present invention is not so limited and the second antenna element 250BG may be coupled to both a receiver and transmitter in a manner substantially similar to that shown for the first antenna element 250A but with the switch selectively coupling the second antenna element 250B to the transmitter rather than the receiver. In such embodiments, operations of the control circuit 255 may be structured to decouple the transmitter connection to the second antenna element 250B concurrently with decoupling of the receiver 244A (through a switch or by turning off the transmitter) in the single antenna receive mode. As such, operations related to providing a transmit only antenna and a receive only antenna in the single antenna receive mode may be provided in a variety of manners in addition to those illustrated in the figures.

As mentioned above, the termination 273 may be provided in a number of ways in various embodiments of the present invention. In some embodiments as particularly discussed above, the control circuit 255 is configured to alter the configuration of the plurality of antennas 250A, 250B by turning off the first amplifier 244A. In other embodiments, the termination 273 is a ground reference and the control circuit 255 is configured to alter the configuration of the plurality of antennas 250A, 250B by grounding the second terminal 267B of the duplexer 267. In some embodiments, the termination 273 is a 50 ohm terminator and the control circuit 255 is configured to alter the configuration of the plurality of antennas when in the single antenna receive mode by coupling the second terminal 267B of the duplexer 267 to the 50 ohm terminator 273.

In some embodiments, when the device 100 is in the single antenna receive mode, the device 100 is configured to receive voice communications but not data communications. In the MIMO mode, both the first and second antennas 250A, 250B may be used as receive antennas. In some embodiments, the first antenna 250A is not used in any of the multiple communication modes as a receive antenna when the second antenna is not also used as a receive antenna. In other words, the second antenna 250B is always used as a receive antenna when the device 100 is receiving wireless communications.

The processor 127, which is shown in FIG. 1 as being coupled to the control circuit 155 and the transceiver 140, may be configured increase a transmit power of the transmitter 142, 242. In addition, the processor 127 may be configure to select the single antenna receive mode as the active one of the multiple communication modes when the transmit power of the transmitter 142, 242 exceeds a selection level, such as a level at or near the maximum transmit power, to increase isolation between the first antenna 150A, 150B and the second antenna 150B, 250B when the transmit power of the transmitter 142, 242 exceeds the selection level. The processor 127 may also be configured to reduce the transmit power of the transmitter 142, 242 when the control circuit 155, 255 configures the first antenna 150A, 250A as a transmit only antenna and the second antenna 150B, 250B as a receive only antenna. It will be understood that, in at least some modes, the base station may specify a transmit power level to be used by the device 100. In such embodiments, the device may decrease the transmit power by reducing the input power to the transmit antenna for a given transmit power level.

The processor 127 may also be configured to receive a command to enter the MIMO mode from the receiver 144, 244A, 244B and to select the MIMO mode as the active one of the multiple communication modes responsive to the received command to enter the MIMO mode. As shown in FIG. 1, the transceiver 140 may communicatively couple the device 100 to a base station 146 having a base station scheduler 147 operatively coupled thereto. The command to enter the MIMO mode may be received by the receiver 144, 244A, 244B from the base station scheduler 147.

In addition, the processor 127 may be configured to detect a received signal power level and to report the received signal power level to the base station scheduler 147. The command to enter the MIMO mode may only be received from the base station scheduler 147 when the reported received signal power level exceeds a minimum level. The processor 127 may be configured to exit the MIMO mode responsive to receipt of a command to exit the MIMO mode from the base station scheduler 147. The command to exit the MIMO mode may only be received from the base station scheduler 147 when the reported received signal power level does not exceed the minimum level. In other words, the power level associated with the MIMO mode and the selection level for the transmit power of the antenna to select single antenna receive mode may be coordinated to ensure that single antenna receive mode is never selected when the base station scheduler 147 has selected the MIMO mode. Stated differently, the selection level for selecting the single antenna receive mode may correspond to a received signal power level that does not exceed the minimum level so that the processor 127 does not select the single antenna receive mode when the base station scheduler 147 selects the MIMO mode.

It will be understood that other modes than the single antenna receive mode may be selected by the device 100 when not in the MIMO mode. For example, the device 100 may determine that, while MIMO mode is not available, diversity reception, using both antennas as receive antennas, is the preferred alternative to the MIMO mode under the then current operating conditions.

The processor 127 may be configured to increase the transmit power of the transmitter 142, 242 when the detected received signal power decreases and to decrease the transmit power when the detected received signal power increases or otherwise responsive to the base station specified transmit power level. It will be understood that configuring the device 100 in the single antenna receive mode may reduce the power loss through the duplexer 267 to the amplifier 244A. As such, the processor 127 may also be configured to reduce the transmit power of the transmitter 142, 242 when the control circuit 155, 255 configures the first antenna 150A, 250A as a transmit only antenna and the second antenna 150B, 250B as a receive only antenna.

Although FIGS. 1 to 3 illustrate example wireless communication devices including reconfigurable antenna arrays according to some embodiments of the present invention, it will be understood that the present invention is not limited to such configurations but is intended to encompass any configuration capable of carrying out operations described herein. More generally, although illustrated with reference to specific blocks having specific functions, it is to be understood that the functionality of these blocks may be combined, divided, and/or eliminated.

Figure 4:
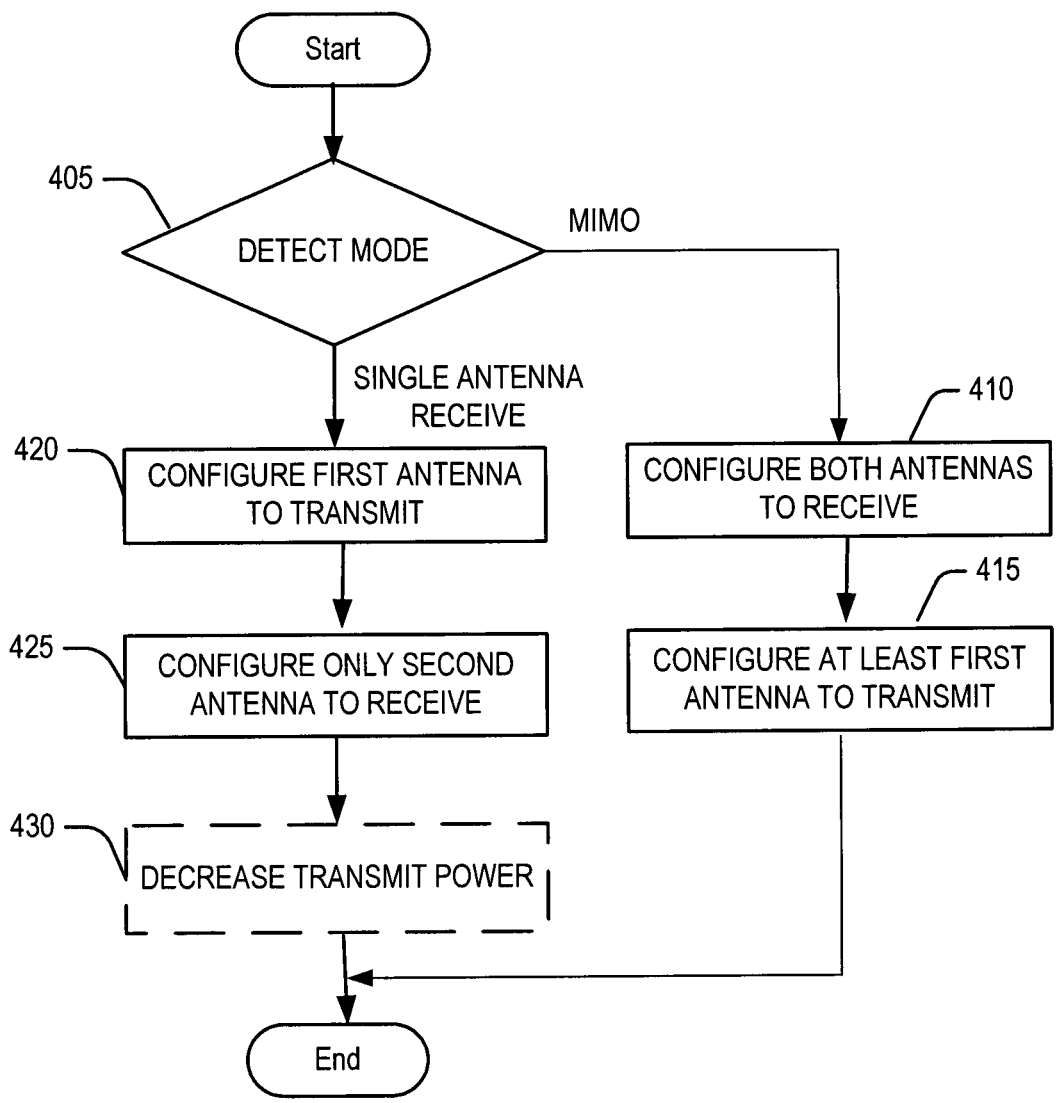
FIG. 4 is a flowchart illustrating methods for operating an antenna system in a wireless communication device according to some embodiments of the present invention.
Figure 1:
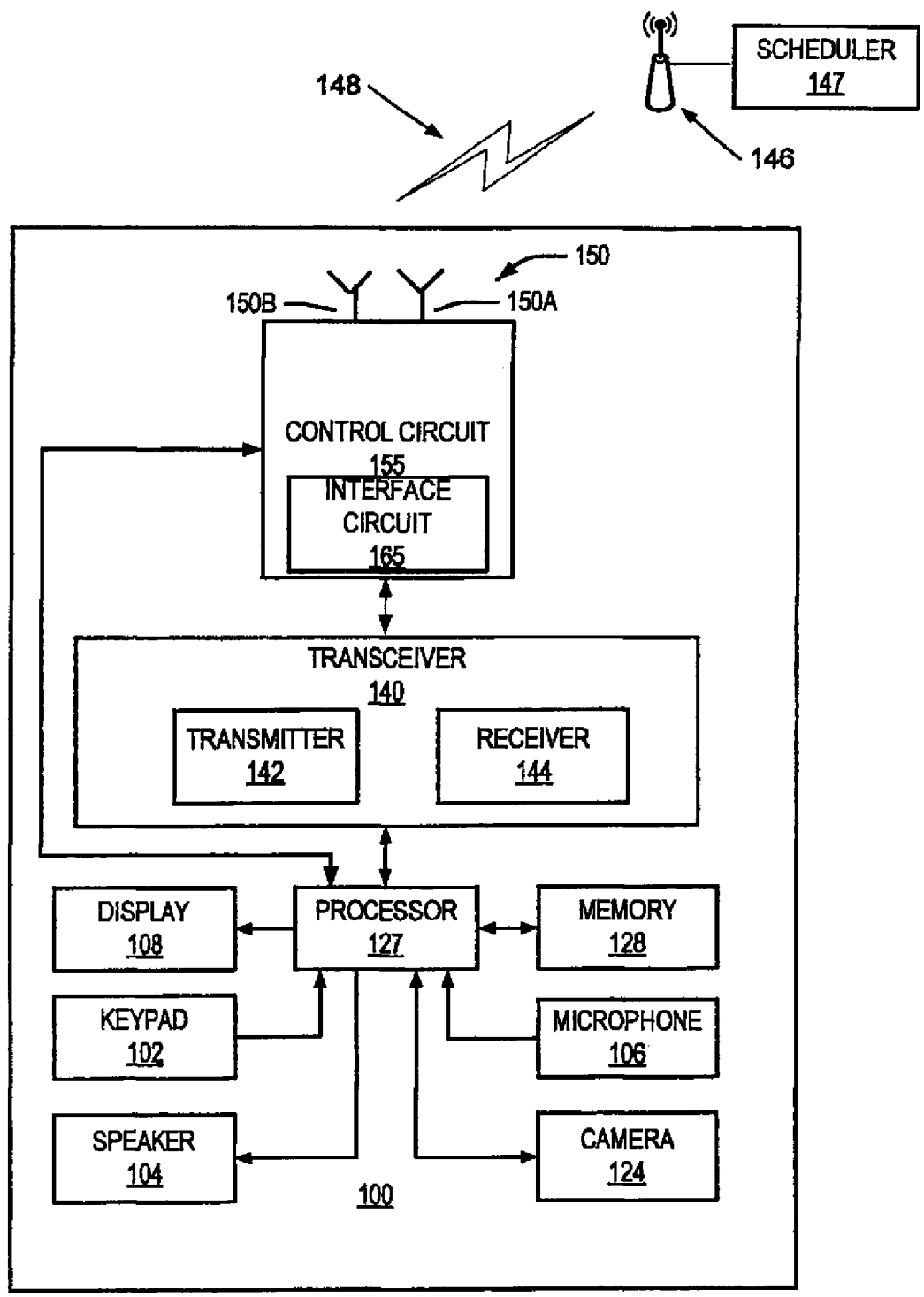

FIG. 4 is a flowchart illustrating methods of operating an antenna system of a wireless communication device including a first antenna and a second antenna. For the illustrated embodiments, operations begin at Block 405 by determining a selection of a communication mode for the device. The first antenna and the second antenna are configured to receive a signal responsive to detection of selection of a multiple input multiple output ("MIMO") mode of the antenna system (Block 410). At least the first antenna is configured to transmit a signal responsive to detection of selection of the MIMO mode (Block 415). Only the first antenna is configured to transmit responsive to detection of selection of a single antenna receive mode of the antenna system (Block 420). Only the second antenna is configured to receive a signal responsive to detection of selection of the single antenna receive mode (Block 425). The operations at Blocks 420 and 425 may be carried out automatically (without user intervention).

The first antenna may be coupled to a receiver through an amplifier and operations at Block 425 may include turning off the amplifier. The first antenna may coupled to a transmitter through a first terminal of a duplexer and to a receiver through a second terminal of the duplexer and operations at Block 425 may include grounding the second terminal of the duplexer or coupling the second terminal of the duplexer to a 50 ohm terminator.

In some embodiments, operations at Block 405 for detecting a mode include selecting the single antenna receive mode when a transmit power of the transmitter coupled to the first terminal of the duplexer exceeds a selection level to increase isolation between the first and second antennas when the transmit power of the transmitter exceeds the selection level. In addition, for some embodiments, the method may further include decreasing the transmit power of the transmitter when only the second antenna is configured to receive a signal (Block 430). In addition, the single antenna receive mode may be selected when it is determined that only voice communications are requested, for example, by a user requesting or receiving a voice call.

The flowchart of FIG. 4 illustrates the architecture, functionality, and operations of embodiments of hardware and/or software according to various embodiments of the present invention. It will be understood that each block of the flowchart and/or block diagram illustrations, and combinations of blocks in the flowchart and/or block diagram illustrations, may be implemented by computer program instructions and/or hardware operations. In this regard, each block represents a module, segment, or portion of code, which comprises one or more executable instructions for implementing the specified logical function(s). It should be noted that, in other implementations, the function(s) noted in the blocks may occur out of the order noted in FIG. 4. For example, two blocks shown in succession may, in fact, be executed substantially concurrently, or the blocks may sometimes be executed in the reverse order, depending on the functionality involved.

The computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks. The computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

As described above, some embodiments of the present invention provide a smart antenna array including two or more antenna elements that can be automatically switched between different configurations for different communication modes. In some embodiments, a single receive antenna and separate transmit antenna are used, which may reduce power leakage in the duplexer. The actual power leakage in the duplexer may still be visible but, as the power will. For example, go into a turned off LNA (ideally ground) it will have little or no impact on the sensitivity. The switch point when the secondary antenna should be used as main receive antenna may be configurable through software. In some embodiments, the single antenna receive mode may be used in all cases with voice only communications regardless of transmit power as the benefits of MIMO are generally less important at the lower data rates of voice communications.

In the drawings and specification, there have been disclosed typical embodiments of the invention and, although specific terms are employed, they are used in a generic and descriptive sense only and not for purposes of limitation, the scope of the invention being set forth in the following claims.

That which is claimed:

1. A wireless communication device, comprising:
   a transceiver configured for communication using multiple communication modes, the transceiver comprising a transmitter and a receiver;

a plurality of antennas coupled to the transceiver, the plurality of antennas including a first antenna and a second antenna, wherein the multiple communication modes include a multiple input multiple output ("MIMO") mode and a single antenna receive mode; and a control circuit configured to detect selection of the single antenna receive mode as an active one of the multiple communication modes, to detect selection of the MIMO mode as the active one of the multiple communication modes, to configure at least the first antenna to transmit a signal responsive to detection of the selection of the MIMO mode, and to automatically alter a configuration of the plurality of antennas and transceiver by configuring the first antenna as a transmit only antenna and the second antenna as a receive only antenna responsive to detection of the selection of the single antenna receive mode.

2. The device of claim 1, wherein the control circuit further comprises:

a duplexer having a first terminal that couples the first antenna to the transmitter and a second terminal that couples the first antenna to the receiver, wherein the duplexer is not coupled to the second antenna; and a filter that couples the second antenna to the receiver, and wherein the receiver comprises:

a first amplifier coupled to the first antenna through the second terminal of the duplexer; and a second amplifier coupled to the second antenna through the filter.

3. The device of claim 2, wherein the control circuit is configured to alter the configuration of the plurality of antennas by turning off the first amplifier.

4. The device of claim 2, wherein the control circuit is configured to alter the configuration of the plurality of antennas by grounding the second terminal of the duplexer.

5. The device of claim 2, wherein the control circuit is configured to alter the configuration of the plurality of antennas by coupling the second terminal of the duplexer to a 50 ohm terminator.

6. The device of claim 2, wherein the first and second amplifier comprise low noise amplifiers.

7. The device of claim 2, further comprising a processor coupled to the control circuit and the transceiver that is configured increase a transmit power of the transmitter and to select the single antenna receive mode as the active one of the multiple communication modes when the transmit power of the transmitter exceeds a selection level to increase isolation between the first and second antennas.

8. The device of claim 7, wherein the processor is further configured to reduce the transmit power of the transmitter when the control circuit configures the first antenna as a transmit only antenna and the second antenna as a receive only antenna.

9. The device of claim 8, wherein the processor is further configured to receive a command to enter the MIMO mode from the receiver and to select the MIMO mode as the active one of the multiple communication modes responsive to the received command to enter the MIMO mode.

10. The device of claim 9, wherein the transceiver communicatively couples the device to a base station scheduler and wherein the command to enter the MIMO mode is received by the receiver from the base station scheduler.

11. The device of claim 10, wherein the processor is configured to detect a received signal power level and to report the received signal power level to the base station scheduler and wherein the command to enter the MIMO mode is only received from the base station scheduler when the reported received signal power level exceeds a minimum level and wherein the processor is further configured to exit the MIMO mode responsive to receipt of a command to exit the MIMO mode from the base station scheduler and wherein the command to exit the MIMO mode is only received from the base station scheduler when the reported received signal power level does not exceed the minimum level.

12. The device of claim 11, wherein the processor is further configured to increase the transmit power of the transmitter and to decrease the transmit power and wherein the selection level for selecting the single antenna receive mode corresponds to a received signal power level that does not exceed the minimum level so that the processor does not select the single antenna receive mode when the base station scheduler selects the MIMO mode.

13. The device of claim 1, wherein the first antenna and the second antenna are correlated antennas having less than a 5 decibel (dB) imbalance.

14. The device of claim 1, wherein, when in the single antenna receive mode, the device is configured to receive voice communications but not data communications.

15. The device of claim 1, wherein, in the MIMO mode, both the first and second antennas are used as receive antennas and wherein the first antenna is not used in any of the multiple communication modes as a receive antenna when the second antenna is not also used as a receive antenna.

16. The device of claim 1, wherein the second antenna is not coupled to the transmitter.

17. A method of operating an antenna system of a wireless communication device including a first antenna and a second antenna, the method comprising:

configuring, using a processor and/or control circuit, the first antenna and the second antenna to receive a signal responsive to detection of selection of a multiple input multiple output ("MIMO") mode of the antenna system;

configuring at least the first antenna to transmit a signal responsive to detection of selection of the MIMO mode;

automatically configuring only the first antenna to transmit responsive to detection of selection of a single antenna receive mode of the antenna system; and automatically configuring only the second antenna to receive a signal responsive to detection of selection of the single antenna receive mode.

18. The method of claim 17, wherein the first antenna is coupled to a receiver through an amplifier and wherein automatically configuring only the second antenna to receive a signal comprises turning off the amplifier.

19. The method of claim 17, wherein the first antenna is coupled to a transmitter through a first terminal of a duplexer and to a receiver through a second terminal of the duplexer and wherein automatically configuring only the second antenna to receive a signal comprises grounding the second terminal of the duplexer.

20. The method of claim 17, wherein the first antenna is coupled to a transmitter through a first terminal of a duplexer and to a receiver through a second terminal of the duplexer and wherein automatically configuring only the second antenna to receive a signal comprises coupling the second terminal of the duplexer to a 50 ohm terminator.

21. The method of claim 17, wherein the first antenna is coupled to a transmitter through a first terminal of a duplexer and to a receiver through a second terminal of the duplexer and wherein the method further comprises selecting the single antenna receive mode when a transmit power of the transmitter exceeds a selection level to increase isolation between the first and second antennas.

22. The method of claim 21, further comprising decreasing the transmit power of the transmitter when only the second antenna is configured to receive a signal.

23. The method of claim 17, wherein configuring the first antenna and the second antenna is preceded by:
  determining that only voice communications are requested; and
  selecting the single antenna receive mode when it is determined that only voice communications are requested.

24. The method of claim 17, wherein the method further comprises selecting the single antenna receive mode when a transmit power of a transmitter coupled to the first antenna exceeds a selection level, to increase isolation between the first and second antennas.

* * * * *

UNITED STATES PATENT AND TRADEMARK OFFICE
CERTIFICATE OF CORRECTION

PATENT NO. : 8,830,910 B2  
APPLICATION NO. : 13/496944  
DATED : September 9, 2014  
INVENTOR(S) : Skarp Page 1 of 3

It is certified that error appears in the above-identified patent and that said Letters Patent is hereby corrected as shown below:

On the Title page, showing the illustrative figure, should be deleted and substitute therefor the attached Title page.

In the Drawings

Delete drawing sheet 1 of 4 and substitute therefor the drawing sheet, consisting of fig. 1 as shown on the attached page.

Signed and Sealed this
Thirty-first Day of March, 2015

Michelle K. Lee
*Director of the United States Patent and Trademark Office*

(12) United States Patent
Skarp

(10) Patent No.: US 8,830,910 B2
(45) Date of Patent: Sep. 9, 2014

(54) WIRELESS TERMINALS INCLUDING SMART ANTENNA SYSTEMS HAVING MULTIPLE ANTENNAS

(75) Inventor: Filip Skarp, Sodra Sandby (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 128 days.

(21) Appl. No.: 13/496,944

(22) PCT Filed: Dec. 15, 2010

(86) PCT No.: PCT/IB2010/003254
§ 371 (c)(1),
(2), (4) Date: Mar. 19, 2012

(87) PCT Pub. No.: WO2012/080764
PCT Pub. Date: Jun. 21, 2012

(65) Prior Publication Data
US 2012/0320803 A1  Dec. 20, 2012

(51) Int. Cl.
*H04W 4/00* (2009.01)
*H04B 7/04* (2006.01)
*H04B 7/08* (2006.01)

(52) U.S. Cl.
CPC ........... *H04B 7/0877* (2013.01); *H04B 7/0825* (2013.01); *H04B 7/0404* (2013.01)
USPC .................................................. 370/328

(58) Field of Classification Search
None
See application file for complete search history.

(56) References Cited

U.S. PATENT DOCUMENTS

| | | | |
|---|---|---|---|
| 6,173,014 B1* | 1/2001 | Forssen et al. | 375/267 |
| 7,260,079 B1* | 8/2007 | Chapman et al. | 370/338 |
| 2001/0014588 A1 | 8/2001 | Ishida | |
| 2002/0193146 A1* | 12/2002 | Wallace et al. | 455/562 |
| 2005/0136906 A1* | 6/2005 | Azuma | 455/418 |
| 2007/0167142 A1 | 7/2007 | Kim et al. | |

(Continued)

FOREIGN PATENT DOCUMENTS

WO  WO 2009/120118 A1  10/2009
WO  WO 2010/110800 A1  9/2010

OTHER PUBLICATIONS

International Search Report Corresponding to International Application No. PCT/IB2010/003254; Date of Mailing: Sep. 20, 2011; 13 pages.

(Continued)

*Primary Examiner* — Anh-Vu Ly
*Assistant Examiner* — Gustavo Lopez-Vargas
(74) *Attorney, Agent, or Firm* — Myers Bigel Sibley & Sajovec, PA

(57) ABSTRACT

A wireless communication device includes a transceiver configured for communication using multiple communication modes, the transceiver comprising a transmitter and a receiver. A plurality of antennas is coupled to the transceiver. The plurality of antennas includes a first antenna and a second antenna. The multiple communication modes include a multiple input multiple output ("MIMO") mode and a single antenna receive mode. The device further includes a control circuit configured to detect selection of the single antenna receive mode as an active one of the multiple communication modes and to automatically alter a configuration of the plurality of antennas and transceiver by configuring the first antenna as a transmit only antenna and the second antenna as a receive only antenna responsive to detection of the selection of the single antenna receive mode. Related methods of operation are also discussed.

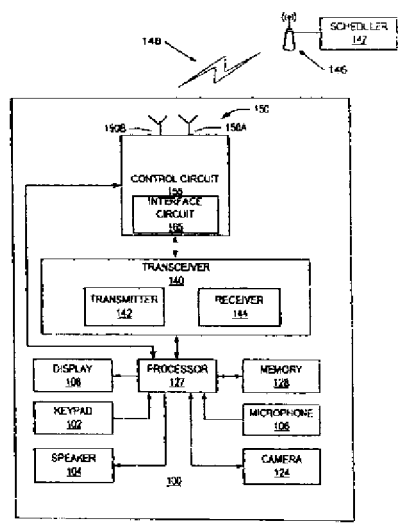

24 Claims, 4 Drawing Sheets